(12) United States Patent
Lukac

(10) Patent No.: US 6,494,471 B2
(45) Date of Patent: Dec. 17, 2002

(54) APPARATUS FOR SENSING AN ANGULAR POSITION OF A WHEEL OF A VEHICLE ABOUT A STEERING AXIS

(75) Inventor: J. Bradley Lukac, Bettendorf, IA (US)

(73) Assignee: New Holland North America, Inc., New Holland, PA (US)

( * ) Notice: Subject to any disclaimer, the term of this patent is extended or adjusted under 35 U.S.C. 154(b) by 21 days.

(21) Appl. No.: 09/843,640

(22) Filed: Apr. 26, 2001

(65) Prior Publication Data

US 2002/0089142 A1 Jul. 11, 2002

Related U.S. Application Data

(60) Provisional application No. 60/260,513, filed on Jan. 9, 2001.

(51) Int. Cl.[7] .............................. B60G 7/00; B60P 7/00; B62D 7/00
(52) U.S. Cl. .................................. 280/93.5; 280/93.512
(58) Field of Search .................... 280/93.5, 93.512; 73/1.75, 1.79, 488, 494; 324/714, 713, 691, 723

(56) References Cited

U.S. PATENT DOCUMENTS

| | | | |
|---|---|---|---|
| 2,923,555 A | 2/1960 | Kost et al. | |
| 3,438,646 A | 4/1969 | Hannapel | 280/87 |
| 3,498,630 A | 3/1970 | Crawford | 280/87 |
| 3,549,166 A | * 12/1970 | Moore et al. | 280/93.512 |
| 3,981,513 A | * 9/1976 | Erskine | 280/93.512 |
| 4,124,079 A | * 11/1978 | Crow | 180/53.4 |
| 4,408,673 A | 10/1983 | Leiber | 180/141 |
| 4,621,833 A | 11/1986 | Soltis | 280/707 |
| 4,775,026 A | 10/1988 | Sollbach et al. | 180/249 |
| 4,798,394 A | * 1/1989 | Pollock et al. | 280/93.512 |
| 4,907,452 A | 3/1990 | Yopp | 73/457 |
| 5,340,137 A | * 8/1994 | Carraro et al. | 280/93.512 |
| 5,366,042 A | 11/1994 | Wilks et al. | 180/253 |
| 5,396,973 A | 3/1995 | Schwemmer et al. | 188/299 |
| 5,490,755 A | * 2/1996 | Billotte | 180/24.03 |
| 5,709,399 A | * 1/1998 | Smith, Jr. | 280/93.512 |
| 6,109,384 A | * 8/2000 | Bromley et al. | 180/242 |
| 6,261,182 B1 | * 7/2001 | Chino et al. | 403/306 |
| 6,293,022 B1 | * 9/2001 | Chino et al. | 33/1 PT |
| 6,302,233 B1 | * 10/2001 | Okamuro et al. | 180/253 |

FOREIGN PATENT DOCUMENTS

EP      0520121 A  * 12/1992  ............ B62D/7/18

* cited by examiner

Primary Examiner—Paul N. Dickson
Assistant Examiner—Joselynn Y. Sliteris
(74) Attorney, Agent, or Firm—John William Stader; Larry W. Miller

(57) ABSTRACT

Apparatus for sensing an angular position of a steerable wheel of a vehicle, such as a work machine or the like, about a steering axis thereof. The apparatus includes a support frame having an upper arm and a lower arm defining a space through which the steering axis passes, and a wheel hub located in the space for supporting the wheel. The steering axis extends through a predetermined bottom axial surface portion of the wheel hub, and a lower kingpin is mounted in a passage through the lower arm and supports the wheel hub in the space for rotation about the steering axis. The lower kingpin includes an axial passage therethrough extending between an upper axial opening facing the bottom axial surface portion of the wheel hub and an externally located bottom opening. A sensor is mounted in connection with the bottom opening of the lower kingpin, the sensor including an element rotatable about a rotational axis, the sensor being operable for sensing a rotational position of the rotatable element about the rotational axis, and a pin extending through the axial passage through the kingpin and having a first end pivotably connected to the wheel hub for rotation therewith, and a second end connected to the element for rotating the element when the wheel hub is rotated about the steering axis.

16 Claims, 4 Drawing Sheets

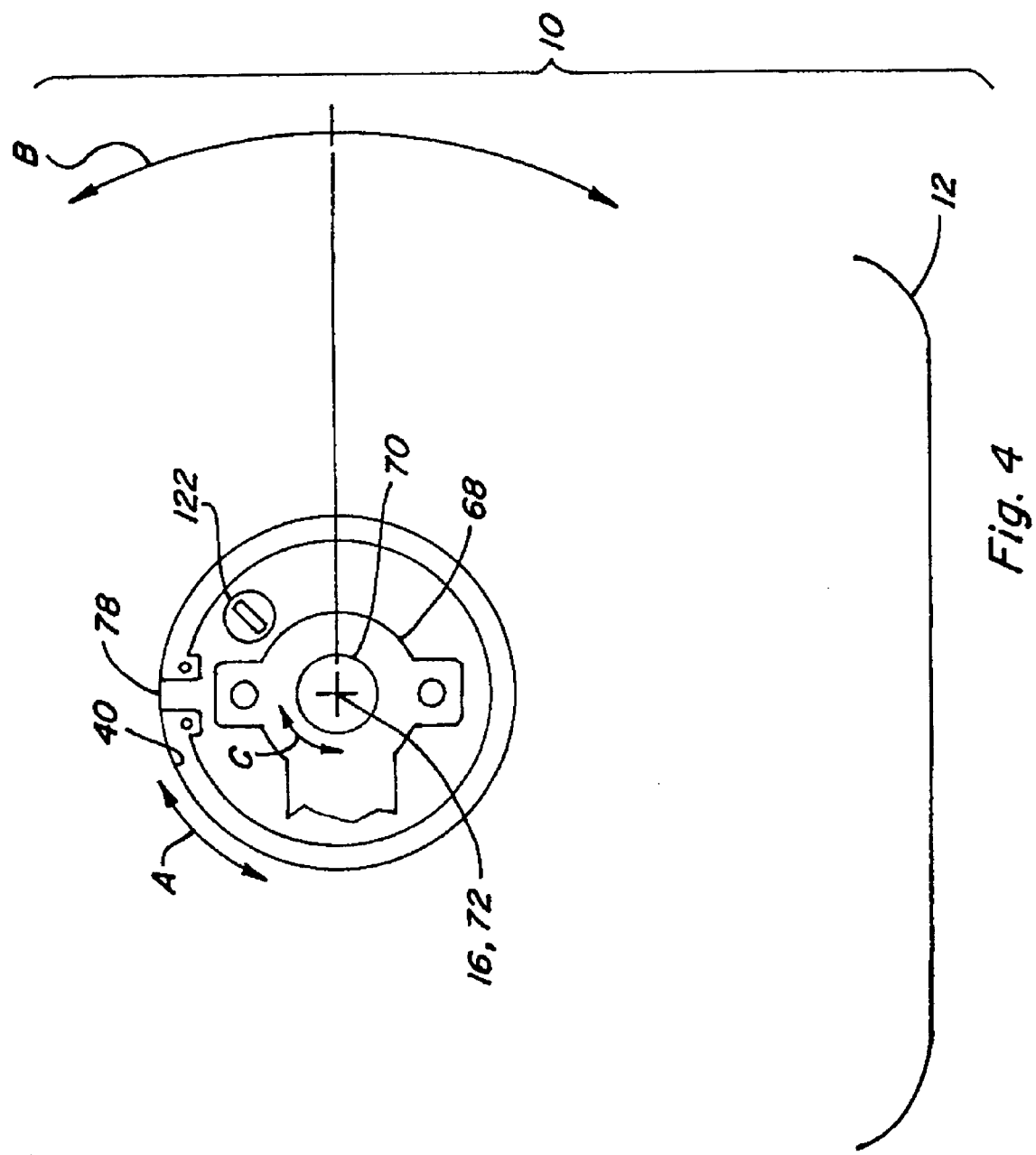

APPARATUS FOR SENSING AN ANGULAR POSITION OF A WHEEL OF A VEHICLE ABOUT A STEERING AXIS

This application claims the benefit of U.S. Provisional Application No. 60/260,513, filed Jan. 9, 2001.

TECHNICAL FIELD

The present invention generally relates to angular position sensors and, more particularly, to apparatus for sensing an angular position of a wheel hub of a steerable wheel of a vehicle about a steering axis thereof, through a kingpin supporting the wheel hub.

BACKGROUND ART

It is a well known, common practice to detect and monitor angular position of steerable wheels of vehicles relative to a reference angular position, such as a straight ahead position, for purposes such as providing a steering input to an automatic guidance system for the vehicle, a differential lock system, and the like. Reference in this regard, Wilks et al. U.S. Pat. No. 5,366,042, issued Nov. 22, 1994 to ZF Friedrichshafen AG of Germany, which discloses a device for detecting different steering angles of a driven wheel of an axle for a motor vehicle, utilizing multiple sensors disposed in radial bores in a housing supporting an axle kingpin for rotation about a steering axis. Reference also Sollbach et al. U.S. Pat. No. 4,775,026, issued Oct. 4, 1988 to Zahnradfabrik Friedrichshafen AG of Germany, which discloses actuation of a differential lock utilizing an inductive switch or potentiometer in the area of angle dependent steering elements held fast in an axle housing of a vehicle for determining steering angle. A particular embodiment of this latter referenced patent mounts a rotary potentiometer in a housing integrated with a pivot bearing, and includes an adjusting pin held in positive engagement with the potentiometer shaft by means of a screwdriver slot and expansion spring for allowing joint rotation thereof, the adjusting pin being clampable in place inside a hollow screw on the steering pivot such that the potentiometer shaft is reliably taken along rotationally with rotation of the pivot. It is recited that small angular errors or normally occurring axial displacements of the foregoing arrangement cause no damage to the potentiometer.

Addressing observed shortcomings of the referenced devices, the former device requires multiple sensors and conductive paths for communication with a signal processing unit for sensing angular position so as to be disadvantageous costwise. A shortcoming of the latter referenced arrangement is only a limited capability for compensating for or overcoming misalignment of the potentiometer or other sensor relative to the steering pivot and variances in the distances therebetween resulting from manufacturing and assembly tolerances, damage, and wear. Another shortcoming is the location of the potentiometer or other sensor in a difficult to access location within the axle housing, thus requiring substantial disassembly for accessing the potentiometer for service and replacement.

Accordingly, it would be desirable to provide apparatus for sensing an angular position of a steerable wheel arrangement of a vehicle about a steering axis thereof, which overcomes the shortcomings discussed above.

SUMMARY OF THE INVENTION

According to the invention, apparatus for sensing an angular position of a steerable wheel of a vehicle, such as a work machine or the like, about a steering axis thereof, is disclosed. The apparatus includes a support frame having an upper arm and a lower arm projecting therefrom defining a space therebetween, the lower arm having a passage therethrough communicating with the space, the steering axis extending through the space and the passage; a wheel hub being located in the space for supporting the wheel, the steering axis extending through a predetermined bottom axial surface portion of the wheel hub; a lower kingpin mounted in the passage through the lower arm and supporting the wheel hub in the space for rotation about the steering axis, the lower kingpin including an axial passage therethrough extending between an upper axial opening facing the bottom axial surface portion of the wheel hub and a bottom opening; a sensor mounted in connection with the bottom opening of the lower kingpin, the sensor including an element rotatable about a rotational axis, the sensor being operable for sensing a rotational position of the rotatable element about the rotational axis; and a pin extending through the axial passage through the kingpin and having a first end pivotably connected to the wheel hub for rotation therewith, and a second end connected to the element for rotating the element when the wheel hub is rotated about the steering axis.

BRIEF DESCRIPTION OF THE DRAWINGS

A non-limiting embodiment of the present invention will be described by way of example with reference to the accompanying drawings, in which:

FIG. 4 is a simplified bottom view of the apparatus of FIG. 1 for illustrating angular adjustability of the sensor thereof.

BEST MODE FOR CARRYING OUT THE INVENTION

Figure 1:
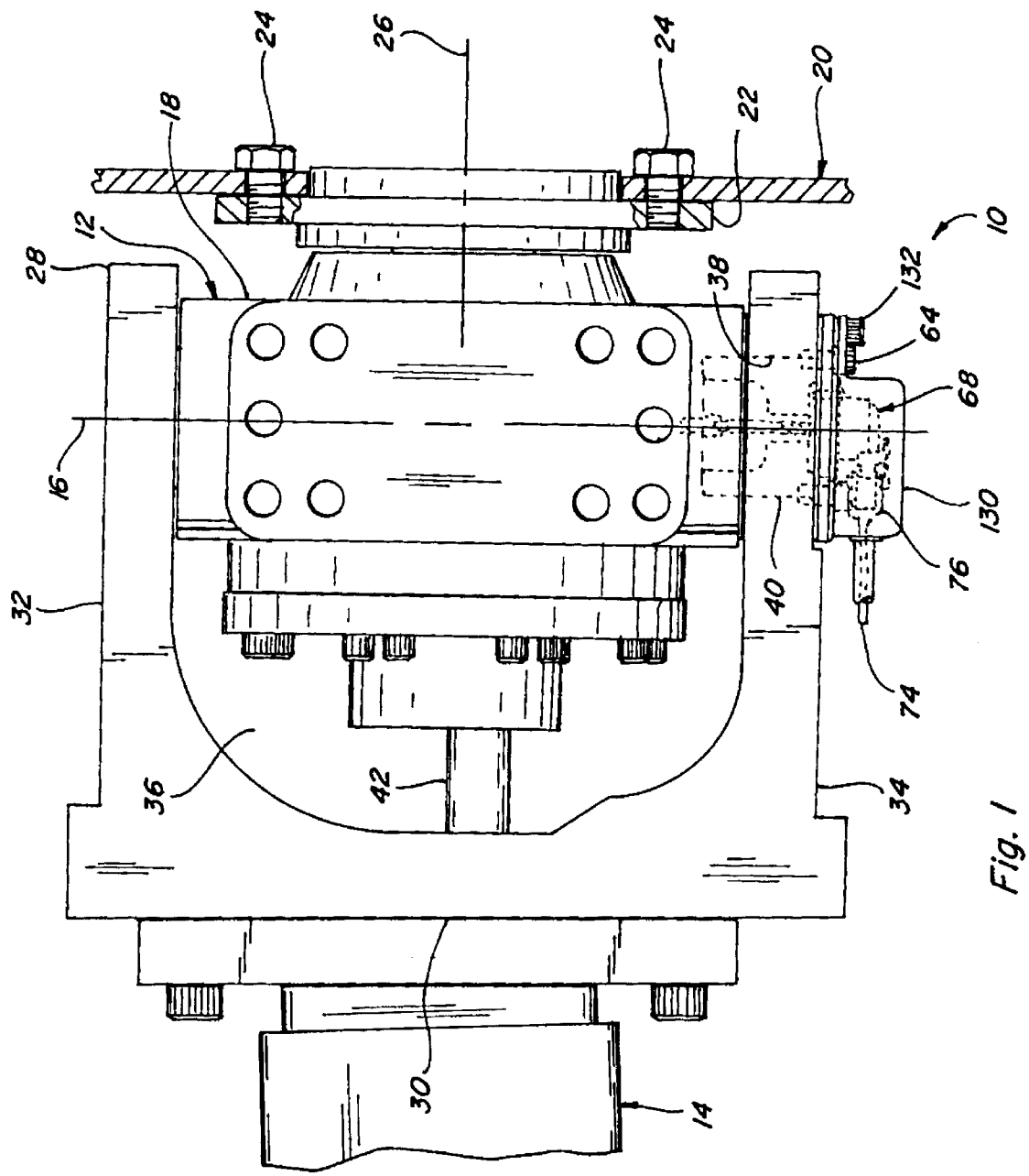
FIG. 1 is a fragmentary side elevational view of apparatus for sensing an angular position of a wheel of a vehicle about a steering axis thereof according to the present invention.

Referring now to the drawings, in FIG. 1, apparatus 10 for sensing angular position of a wheel hub 12 of a vehicle 14 about a steering axis of wheel hub 12 is shown. Wheel hub 12 is a conventionally constructed and operable wheel motor including a housing 18 containing a hydraulic motor (not shown) adapted for connection in circuit with a source or pressurized hydraulic fluid, such as a hydraulic pump (also not shown) for receiving pressurized fluid therefrom. The hydraulic motor is operable for rotating a conventional wheel and tire assembly 20, mounted to a mounting flange 22 of wheel hub 12 by an array of lug bolts 24, about a drive axis 26 of the wheel motor in the well known manner. Vehicle 14 shown is a conventionally constructed and operable self propelled cotton harvesting machine which is representative of a wide variety of other agricultural work machines, construction machines, mining machines, forestry machines, and the like, for which the present apparatus has utility. Here, it should be appreciated that although apparatus 10 has utility for use with a wide variety of steerable wheel arrangements, including non-driven or powered wheels, apparatus 10 is particularly advantageous for use with wheels of relatively heavy work machines and vehicles like cotton harvester 14 and other harvesting machines, due to the ability of apparatus 10 to provide accurate, reliable sensing of angular position of the wheel hub and thus the wheel mounted thereto, even under assembly conditions wherein the sensor is significantly misaligned with the steering axis, and/or elements of the support structure and wheel hub 12 are worn due to long, hard use, and/or one or more of such elements is damaged. It should also be appreciated that the present invention provides a substantial advantage in assembly, adjustability and access for service and replacement relative to prior known constructions.

Wheel hub 12 is supported for rotation about steering axis 16 by a C shape support frame 28 of rigid construction having a central portion 30, an upper arm 32 projecting in cantilever relation from the top of central portion 30, and a lower arm 34 projecting from the bottom of central portion 30 in parallel relation to upper arm 32. Central portion 30, upper arm 32, and lower arm 34 of support frame 28 define a space 36 therebetween, steering axis 16 extending at a small acute angle to the vertical direction through arms 32, 34, and space 36. Upper arm 32 has a passage therethrough (not shown) coaxial with steering axis 16, in which an upper kingpin (also not shown) is mounted for supporting wheel hub 12 for rotation about steering axis 16. Similarly, lower arm 34 has a passage 38 therethrough coaxial with steering axis 16, in which a lower kingpin 40 is fixedly mounted for supporting wheel hub 12 for rotation about steering axis 16. Briefly addressing steering, the steering movement of wheel hub 12 and the wheel and tire assembly 20 mounted thereto about steering axis 16 is effected by longitudinal movement of a tie rod 42 connected at one end to wheel hub 12 and at an opposite end to a conventional steering input device (not shown) on vehicle 14, which input device can be manually controlled, typically by a steering wheel, and/or automatically controlled by an automatic guidance system connected to apparatus 10 for receiving steering angle information therefrom.

Figure 2:
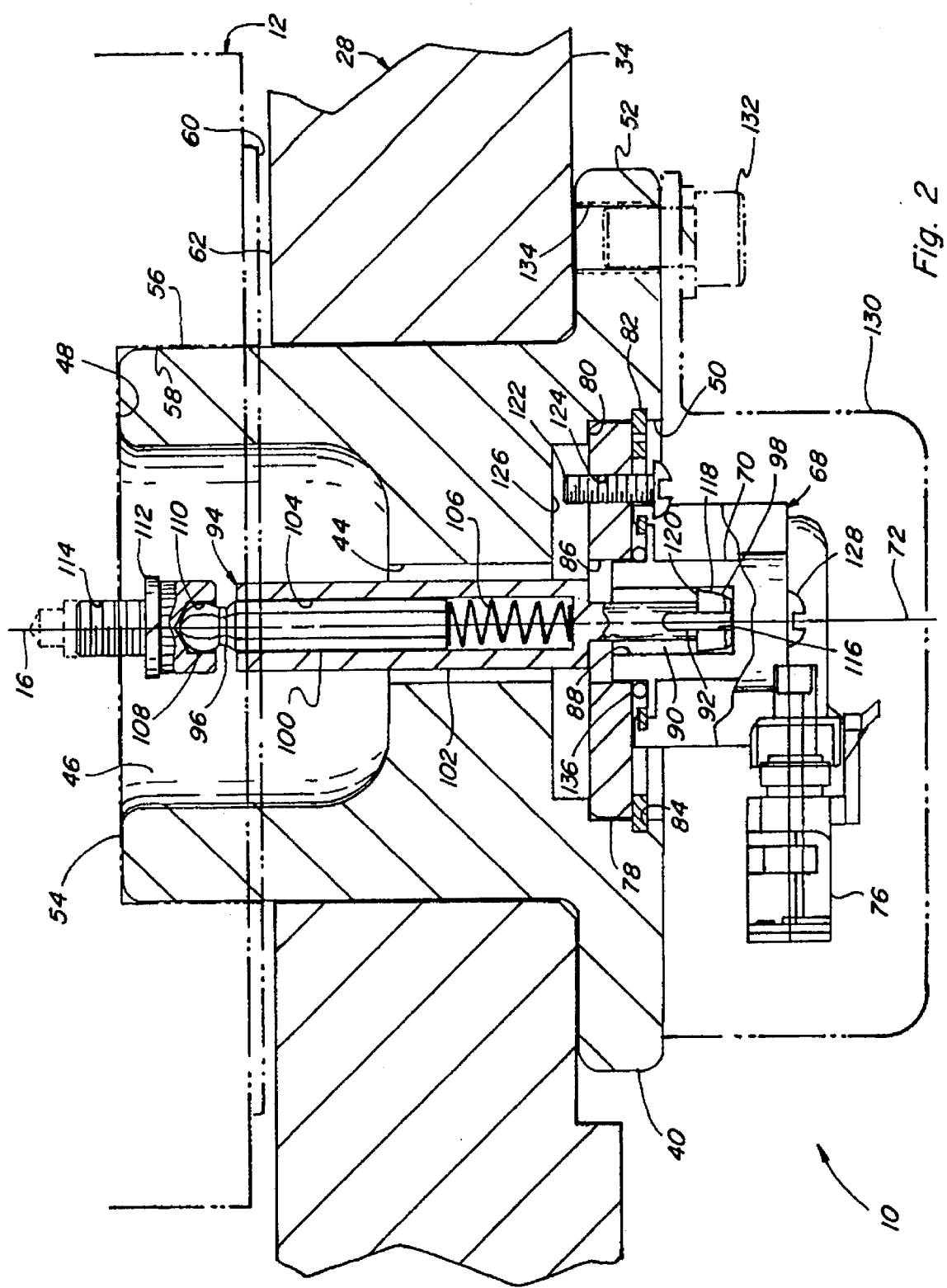
FIG. 2 is an enlarged fragmentary sectional view of the apparatus of FIG. 1, showing a lower kingpin assembly including a sensor thereof.

Referring also to FIG. 2, lower kingpin 40 includes an axial passage 44 therethrough extending between an upper axial opening 46 facing a bottom axial surface portion 48 of wheel hub 12, and an externally located bottom opening 50. By the usage of the term "axial" in connection with passage 44 herein, it is meant that steering axis 16 extends through passage 44, but not necessarily that passage 44 has a central axis coincident with steering axis 16. Lower kingpin 40 includes an upper thrust surface 54 located in abutting, rotatable contact with bottom axial surface portion 48 of wheel hub 12, and an outer radial surface 56 in abutting contact with an inner radial surface 58 of wheel hub 12, for supporting wheel hub 12 for rotation about steering axis 16, such that a bottom-most surface 60 of wheel hub 12 is located in spaced relation to a top surface 62 of lower arm 34. Lower kingpin 40 is mounted to lower arm 34 by an array of bolts 64 threadedly attached to lower arm 34 in the conventional manner, and the various contacting surfaces of kingpin 40 and wheel hub 12 can include conventional bushings and bearings, as required.

Figure 3:
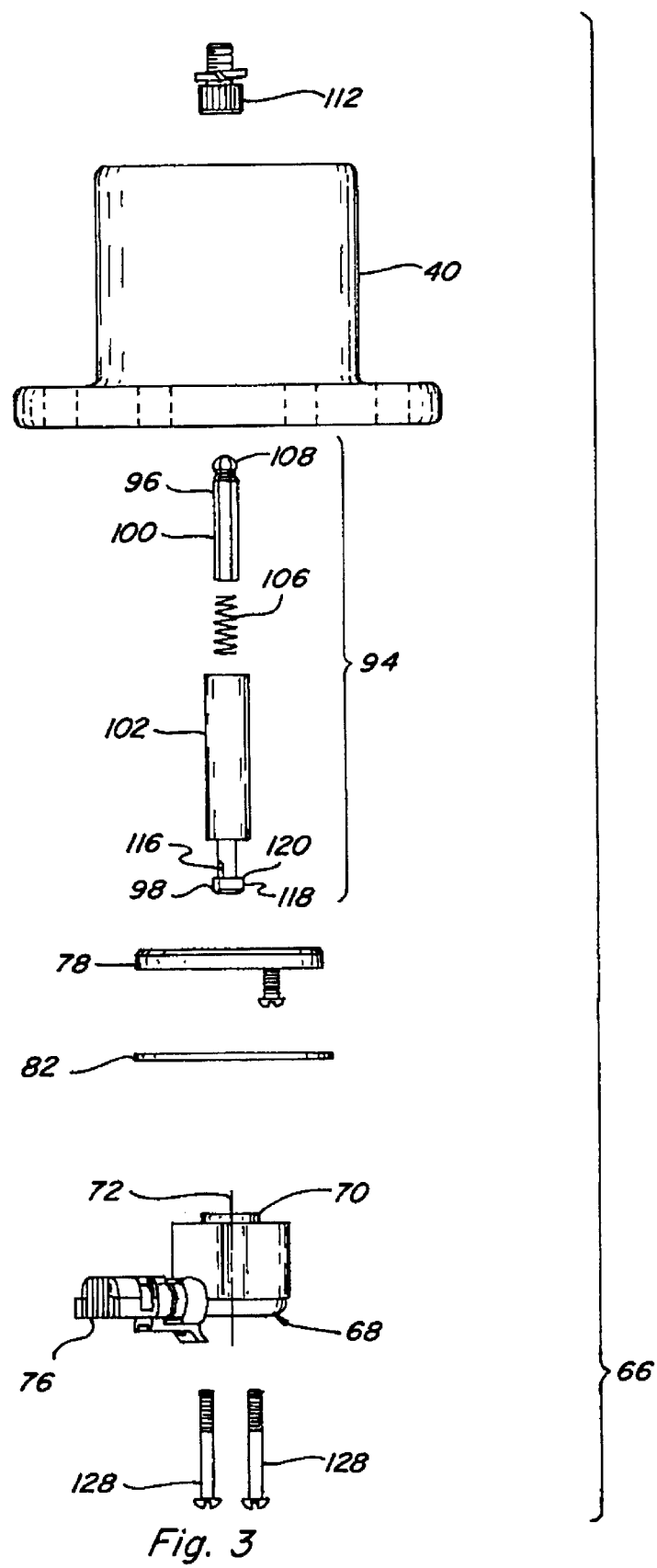
FIG. 3 is an exploded side elevational view of the kingpin and sensor of the apparatus of FIG. 1.

Referring also to FIG. 3, lower kingpin 40 is a component of a kingpin assembly 66 including a sensor 68 which here is a potentiometer including an element 70 mounted for rotation therein about a rotational axis 72 which is ideally at least substantially coincident with steering axis 16, as shown in FIG. 2. Sensor 68 is operable in the conventional manner of potentiometers for detecting changes in small potential differences or electromotive forces resulting from relative rotational movement between sensor 68 and element 70 about rotational axis 72 when a current is applied, and outputting a signal representative of the changes to a system or device, such as an automatic guidance system, over a conductive path 74 (FIG. 1) such as a conventional wire connected to sensor 68 by a connector 76. Sensor 68 is fixedly mounted on a disk 78 located in bottom opening 50 of lower kingpin 40 in abutting relation to an annular shoulder 80 extending around opening 50. Disk 78 is maintained in position against shoulder 80 by an internal retainer ring 82 received in an annular groove 84 around opening 50. Disk 78 includes a centrally located hole 86 therethrough into which a top end of element 70 protrudes, sufficient clearance around element 70 being provided to allow free rotation thereof generally about axis 72. Element 70 includes an internal cylindrical side wall 88 defining an upwardly open receptacle 90 preferably at least substantially coaxial with element 70 about rotational axis 72 and in connection with hole 86 through disk 78 and axial passage 44 of lower kingpin 40, such that a continuous path is present between element 70 and bottom axial surface portion 48 of wheel hub 12. An elongate, axially extending key 92 is a part of, or is mounted to, element 70 in receptacle 90.

A pin 94 extends through axial passage 44 of kingpin 40 and has a first end 96 pivotally connected to wheel hub 12 for rotation therewith, and an opposite second end 98 connected to element 70 for rotating element 70 when wheel hub 12 is rotated about steering axis 16 relative to support frame 28. Pin 94 comprises an assembly of components, including an elongate first pin portion 100 including first end 96, and a second pin portion 102 including second end 98, second pin portion 102 including a socket 104 which telescopically receives first pin portion 100. Socket 104 also contains a resiliently compressible biasing member 106 disposed to urge first pin portion 100 outwardly therefrom, to provide pin 94 with a self-adjusting length feature. First end 96 of first pin portion 100 includes a hexagonal ball end 108 removably receivable in a hexagonal socket 110 in a socket head cap screw 112, forming a pivotable hexagonal ball joint. Screw 112 is threadedly received in a threaded hole 114 in bottom axial surface portion 48, threaded hole 114 preferably having a central axis substantially coincident with steering axis 16 such that hexagonal socket 110 is substantially coaxial with steering axis 16. Second end 98 of pin 94 is cooperatively received in receptacle 90 of element 70 of sensor 68 and includes an elongate, axially extending keyway 116 sized and shaped for receiving key 92 such that element 70 will rotate with pin 94. Second end 98 includes a frusto-conical or tapered outer surface portion 118 tapering outwardly or extending divergently toward an annular terminal edge 120, edge 120 having a diametrical extent corresponding to a diametrical extent of receptacle 90, such that only annular line contact is made between terminal edge 120 and side wall 88 defining receptacle 90, forming a pivotable keyed connection between second end 98 of pin 94, and element 70.

By virtue of the pivotable connection of first end 96 of pin 94 to socket head cap screw 112 on wheel hub 12, the pivotable connection of second end 98 to element 70, and the self-adjusting length of pin 94, closely corresponding rotation of element 70 by rotation of wheel hub 12 is achieved, without application of any significant or potentially damaging force against sensor 68 or element 70, even under assembly and tolerance stack up conditions wherein element 70 and screw 112 are juxtaposed or offset one to the other, and/or steering axis 16 and rotational axis 72 significantly diverge or intersect instead of being substantially coaxial as is ideal. The self-adjusting length of pin 94 importantly also automatically compensates for relatively large vertical manufacturing and assembly tolerances, and the biasable compressibility thereof facilitates assembly thereof into kingpin 40 and allows pin 94 to absorb shocks which could otherwise be transmitted to sensor 68 and/or element 70 and cause damage thereto. Still further, in the event that during use support frame 28 is bent or otherwise damaged, or is flexed or deformed such that upper arm 32 and lower arm 34 are significantly out of parallel, and/or the amount of space between bottom-most surface 60 of wheel hub 12 and top surface 62 changes due to wear, and/or surfaces 48, 54, 56, and 58 wear, pin 94 can compensate or adjust, such that effective operation of sensor 68 and connection to wheel hub 12 is maintained and damage to sensor 68 is avoided. This is an important capability of apparatus 10, as the static load transferred by support frame 28 to wheel hub 12 can be quite high, in an approximate range of from 15,000 to 20,000 pounds, and the dynamic loading can be much greater, for instance, when vehicle 14 is driven over deep furrows and ruts in an agricultural field, or vehicle 14 is turned abruptly in the headlands of a field, such that any of the above discussed conditions can be reasonably anticipated to be encountered, particularly wear after years of use and possible neglect from a lubrication standpoint.

Referring also to FIG. 4, to lock or secure disk 78 of apparatus 10 to kingpin 40 such that sensor 68 is held in a selected angular or rotational position about rotational axis 72 and thus steering axis 16, a locking screw 122 is threadedly received in a threaded hole 124 through disk 78, locking screw 122 being threadable into hole 124 and of sufficient length so as to be capable of being brought to bear against an axially facing surface 126 of kingpin 40. When locking screw 122 is free from surface 126, disk 78 with sensor 68 fixedly mounted thereto is rotatable in bottom opening 50 of kingpin 40 relative to element 70 for adjusting the angular or rotational position of sensor 68 about steering axis 16 for any desired purpose. For instance, it is often desired for sensor 68 to output a signal having a predetermined value when wheel hub 12 is in a straight ahead driving position wherein drive axis 26 of wheel hub 12 is perpendicular or nearly so relative to the driving direction. To attain this signal value, sensor 68 and disk 78 need merely be rotated relative to kingpin 40, as denoted by arrow A, to the required angular position about steering axis 16. Then, locking screw 122 can be tightened against surface 126, to retain sensor 68 in the required position. Subsequently, when relative rotation of wheel hub 12 and lower kingpin 40 occurs, as denoted by arrow B, element 70 will rotate by a closely corresponding amount relative to sensor 68, as denoted by arrow C, causing the output signal of sensor 68 to change correspondingly to the rotation.

Referring in particular to FIGS. 1–3, sensor 68 can be fixedly mounted to disk 78 using any suitable permanent or removable fasteners, such as screws 128 threadedly receivable in threaded holes in disk 78. An important advantage of the spring-loaded design of pin 94 is that it allows for easy installation and replacement. In particular, when installing pin 94 and sensor 68, lower kingpin 40 and other steering components do not have to be removed. Instead, ball end 108 of pin 94 can simply be inserted through passage 44 through lower kingpin 40 into socket 110 of socket head cap screw 112. Then, due to the self-adjusting length feature of pin 94 by virtue of the multiple piece construction thereof and the presence of resiliently compressible biasing member 106 therein, pin 94 will be of sufficient length to allow the installer to hold it in place while second pin portion 102 is inserted into receptacle 90 of element 70 of sensor 68 and matingly engaged with key 92. Then, when the installer releases pin 94, it will be held in place by the biasing action of biasing member 106, which will be increasingly compressed as sensor 68 is brought into position for mounting to disk 78 using screws 1 28. Once sensor 68 is mounted, biasing member 106 will remain compressed, To maintain the ends of pin 94 in engagement with both cap screw 112 and sensor 68. Subsequently, with the removal of screws 128, and by virtue of the location of sensor 68 in connection with externally located bottom opening 50 of kingpin 40, sensor 68, pin 94, and screw 112 can be easily and quickly accessed, removed, and replaced, as required.

To protect sensor 68, a removable cover 130 is provided which is securable in position over sensor 68 by one or more screws 132 threadedly receivable in threaded holes 134 in flange 52 of kingpin 40. To prevent grease used for lubricating the contacting surfaces of wheel hub 12 and kingpin 40 from entering sensor 68, an O-ring 136 is disposed around element 70, as also shown in FIG. 2.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for sensing an angular position of a wheel of a vehicle about a steering axis thereof, comprising:

a support frame having an upper arm and a lower arm projecting therefrom defining a space therebetween, the lower arm having a passage therethrough communicating with the space, the steering axis extending through the space and the passage:

a wheel hub located in the space for supporting the wheel, the steering axis extending through a predetermined bottom axial surface position of the wheel hub;

a lower kingpin mounted in the passage through the lower arm and supporting the wheel hub in the space for rotation about the steering axis, the lower kingpin including an axial passage therethrough extending between an upper axial opening facing the bottom axial surface portion of the wheel hub and a bottom opening;

a sensor mounted in connection with the bottom opening of the lower kingpin, the sensor including an element rotatable about a rotational axis, the sensor being operable for sensing a rotational position of the rotatable element about the rotational axis; and a pin extending through the axial passage through the kingpin and having a first end pivotably connected to the wheel hub for rotation therewith and a second end connected to the element for rotating the element when the wheel hub is rotated about the steering axis, wherein the pin has an automatically adjustable length between the first end and the second end thereof.

2. The apparatus of claim 1, wherein the sensor is adjustably mounted in the bottom opening of the lower kingpin to allow adjustably rotating the sensor relative to the kingpin and the wheel hub to attain a desired angular position of the sensor about the steering axis, the apparatus including a locking element for securing the sensor in the desired angular position.

3. The apparatus of claim 1, wherein the sensor comprises a potentiometer.

4. The apparatus of claim 1, wherein the second end of the pin is pivotably connected to the element.

5. The apparatus of claim 1, wherein the pin includes a first pin portion including one of the ends of the pin, and a second pin portion including another of the ends, the first pin portion being telescopically received in a socket of the second pin portion, and a resiliently compressible biasing member being located in the socket urging the first pin portion outwardly therefrom.

6. The apparatus of claim 1, wherein the first end of the pin is pivotably connected to the wheel hub by a hexagonal ball joint receivable in a hexagonal ball socket on the wheel hub.

7. The apparatus of claim 1, wherein the second end of the pin is connected to the element of the sensor by a pivotable keyed joint.

8. A kingpin assembly for supporting a wheel hub of a vehicle for rotation about a steering axis extending through the kingpin and the wheel hub comprising:

a kingpin having an axial passage therein extending between an opening to be located in opposing relation to an axial surface of the wheel hub when the kingpin is in support thereof and an external opening accessible form outside of the kingpin when supporting the wheel hub;

a sensor mounted in connection with the external opening of the kingpin, the sensor including an element rotatable about a rotational axis, the sensor being operable for sensing a rotational position of the element about the rotational axis; and a pin extending through the passage through the kingpin and having a first end including a connector for pivotal connection to the axial surface of the wheel hub for rotation therewith and a second end connected to the element for rotating the element when the wheel hub is rotated about the steering axis, wherein the pin is self-adjusting in length between the first end and the second end thereof.

9. The kingpin assembly of claim 8, wherein the sensor is adjustably mounted in connection with the external opening of the kingpin to allow adjustably rotating the sensor relative to the kingpin and the wheel hub to attain a desired angular position of the sensor about the steering axis, and the assembly further includes a locking element for securing the sensor in the desired angular position.

10. The kingpin assembly of claim 8, wherein the sensor comprises a potentiometer.

11. The kingpin assembly of claim 8, wherein the second end of the pin is pivotally connected to the element of the sensor.

12. The kingpin assembly of claim 8, wherein the pin includes a first pin portion including one of the ends of the pin, and a second pin portion including another of the ends, the first pin portion being telescopically received in a socket in the second pin portion, and a resiliently compressible biasing member being located in the socket urging the first pin portion outwardly from the socket.

13. The kingpin assembly of claim 8, wherein the connector on the first end of the pin is a hexagonal ball.

14. The kingpin of claim 8, wherein the second end of the pin is connected to the element of the sensor by a pivotable keyed connection.

15. A sensor for determining a position of a wheel hub of a vehicle about a steering axis extending through the wheel hub, comprising:

a disk mountable for rotation about the steering axis in an external axial opening of a kingpin for supporting the wheel hub for rotation about the steering axis, the axial opening connecting with an axial passage extending to an opening located in opposing relation to an axial surface of the wheel hub;

a sensor mounted on the disk, the sensor including an element rotatable about a rotational axis positioned to be at least generally coincident with the steering axis when the disk is mounted in the external axial opening of the kingpin, the sensor being operable for sensing a rotational position of the element about the rotational axis;

a pin having an end pivotably connected to the rotatable element for rotation therewith and extending outwardly therefrom so as to extend through the axial passage of the kingpin when the disk is mounted in the external axial opening of the kingpin, the pin including another end including a connector for pivotable connection to the axial surface of the wheel hub for rotation therewith when the wheel hub is rotated about the steering axis; and a locking element for securing the disk to the kingpin al. a desired angular position about the steering axis, wherein the pin includes a first pin portion including one of the ends of the pin, and a second pin portion including another of the ends, the second pin portion including a socket telescopicaly receiving the first pin portion for allowing adjusting the length of the pin.

16. The sensor of claim 15, wherein a resiliently compressible biasing member urges the first pin portion outwardly from the socket for automatically adjusting the length of the pin.

* * * * *